March 5, 1935.  L. GRUDIN  1,992,944
READING DEVICE
Filed April 26, 1933  2 Sheets-Sheet 1
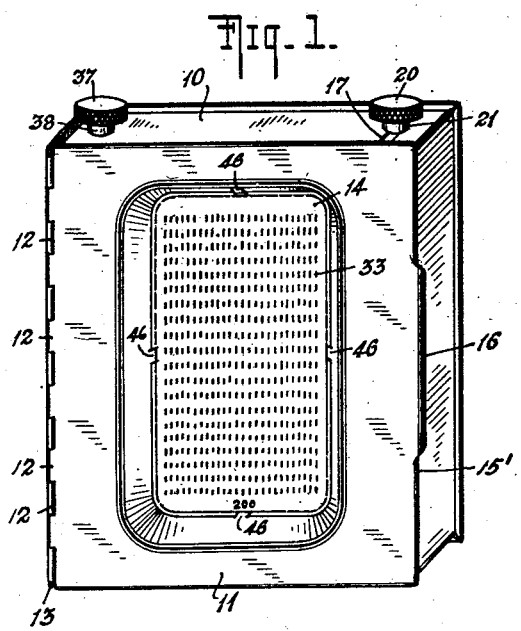
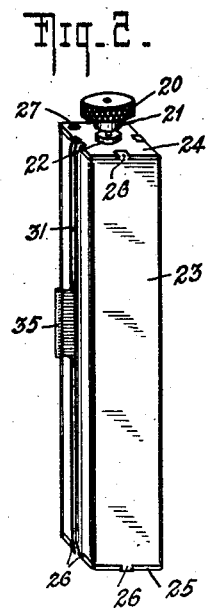
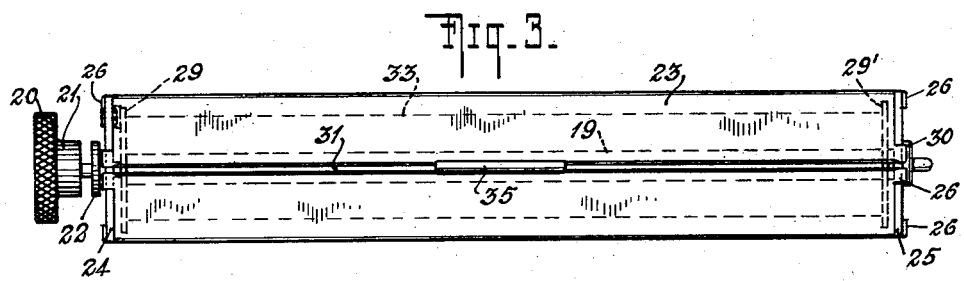
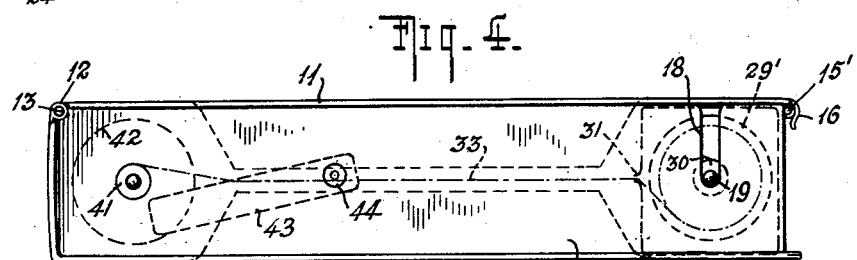
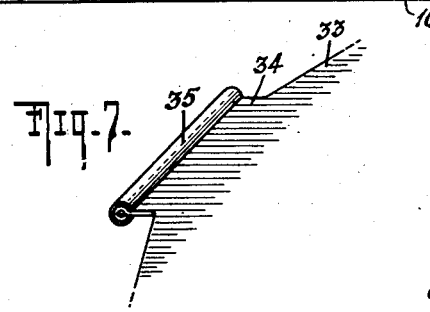
INVENTOR
LOUIS GRUDIN
BY
ATTORNEY

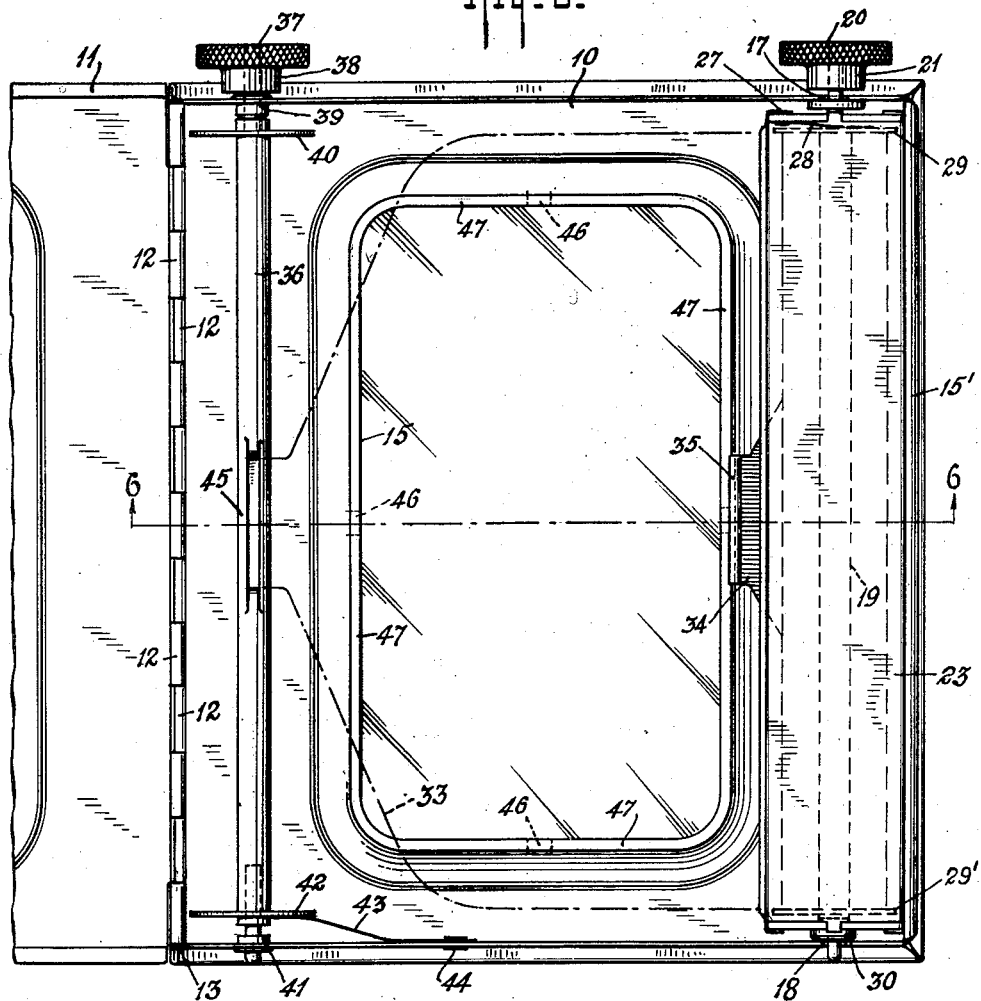

Patented Mar. 5, 1935

1,992,944

UNITED STATES PATENT OFFICE 1,992,944

READING DEVICE

Louis Grudin, New York, N. Y.

Application April 26, 1933, Serial No. 667,978

9 Claims. (Cl. 40—86)

My invention relates to a device for receiving and retaining printed matter in such a way that the reading matter is made visible to the eye of the reader so as to facilitate the reading thereof without the interruption of the attention necessitated by the turning of pages of a book and automatically marking the page where reading may be resumed after interruption in reading; and so as to present a compact mechanical support for the strip of paper, parchment, or the like, upon which the reading matter is printed. The mechanical support is furthermore so designed as to permit convenient removal of the strip of reading matter and insertion of any other similar strip for further reading. In accordance with my invention, I provide a book of reading matter of any usual size in a compact form printed upon a continuous strip wound into a roll, or more particularly, provided in the form of a scroll adapted to be inserted into a reading device comprising a frame of a design preferably imitative of a book, a drum or shaft having wound thereon the strip upon which the reading matter is printed, a second drum or shaft upon which the strip is adapted to be wound as the printed matter has been read, and means for imparting a rotary motion to each of the shafts so that as the strip passes from one shaft to the other its surface, having the reading matter imprinted thereon, is exposed through a window provided in the frame between said shafts.

An object of my invention is to provide a reading device which permits the insertion of a roll of printed matter into a portion of the device, and to be unwound from such roll and into a second roll positioned on the other side of said reading device so that the reading matter printed upon the strip is exposed at a portion of the device intermediate its two sides. Another object of my invention is to provide a compact form of a volume of a book or magazine of standard length and in a form capable of easy manipulation for inserting the same into my reading device and removing it therefrom. A still further object of my invention is to provide mechanism in such reading device for advancing the strip through the device, i. e., for unwinding the strip of reading matter from one reel and winding it onto the other reel with certainty of operation and a minimum of effort. A still further object of my invention is to provide mechanism whereby the strip of reading matter, as it is unwound from one reel, is automatically wound upon the other. Further and other objects of the invention will appear from the description hereinafter and from the drawings forming part of this specification.

Heretofore, for centuries since the invention of the printing press, books, magazines, etc., have been sold to the general public in bound volumes comprising a great number of pages of printed matter bound into book or magazine form by being sewn, pasted, etc., between two "covers" of substantially stronger texture than the remaining pages of the book or magazine. The publishing industry has never employed any other manner of providing the reading public with its desired reading matter of a more or less permanent nature. Novels, text books, and other volumes have always been published in the well-known and hitherto serviceable manner. In the modern mechanical age, however, there is a widespread need for a mechanical improvement in the structure of books, designed for greater economy of material, compactness to save space in handling and storing and to save time and effort in the reading of books, without sacrifice of durability or appearance. This need has made it necessary to devise a simple, compact, and easily manipulated physical format for reading matter such as fiction, biography or other literature usually issued in book form.

Although previously a great variety of materials has been furnished in the form of strips on reels or spools, as in the case of motion picture film, movable signs, etc., such devices have never been adaptable to the particular use of book reading, which, in the nature of its material, its construction and its manipulation, has never heretofore succeeded in making such means available for practical and economical adaptation to its peculiar requirements.

My invention is designed to provide such a compact and novel means of furnishing reading matter of the usual book length. It presents reading matter in a compact form and in conjunction with a reading device which is simple in construction, inexpensive in manufacturing cost, and is characterized by paucity of parts and simplicity of manipulation.

A particular embodiment of my invention is illustrated in the accompanying drawings forming part of this specification, in which Fig. 1 is a perspective view of a reading device constructed in accordance with my invention; Fig. 2 is a perspective view of the removable box member containing a scroll of printed matter, adapted to be inserted into the book form comprising the frame of my reading device; Fig. 3 is a side view of the box member illustrated in Fig. 2; Fig. 4 is a bottom or end view of my novel reading device; Fig. 5 is a plan view of the device with the cover of the frame open to show the interior arrangement of its elements; Fig. 6 is a section along the line 6—6 of Fig. 5 with the cover in its closed position; and Fig. 7 is an enlarged detail view of the anchoring member at the end of the strip forming the scroll, by means of which such strip is anchored to the shaft upon which it is to be wound.

Referring more particularly to the drawings, in which similar reference characters identify similar parts in the several views, 10 designates a frame or receptacle formed of sheet metal or other rigid material, for instance, aluminum, having the outlines of a book and provided with a cover 11 hinged along its longitudinal edge to the upper edge of the panel forming one of the longitudinal sides or back of the frame. The hinging of the cover to the edge of the frame is accomplished by any suitable means, for instance, by a plurality of alternating hinge units 12, 12, encircling a rod 13 running the length of the frame. The cover of the frame is formed with a window 14 cut from its surface, the material of the cover contiguous with the edges forming said window being depressed from the surface of the cover in the manner and for the purpose hereinafter to be described.

The frame or receptacle 10 is formed with a back similar to the cover just described, being provided with a window 15 the peripheral edges of which come into proximate relationship with the peripheral edges of the window 14 of the cover 11 when such cover is in closed position. The upper front edge of the frame adapted to contact with the outer front edge of the cover when the latter is being brought to a closed position, is provided with a bead 15', the edge of the cover 11 having a curved flange 16 protruding therefrom and adapted to engage the bead 15' to effect a closure of the cover 11 upon the frame 10.

The walls constituting the upper and lower ends of the frame 10 are provided with slots 17 and 18 near their right hand ends, such slots being of a depth slightly greater than one-half the width of the walls. Within these slots is adapted to be introduced the shaft upon which is wound the scroll bearing the printed matter, one end of such shaft engaging the slot 17 and the other end of such shaft engaging the slot 18.

The shaft 19 is provided at its upper end with knurled knob 20 having a hub 21 and a collar 22 spaced therefrom a distance sufficient to accommodate between the face of such hub and the outer face of the collar, the thickness of material forming the sides of the slot 17. The shaft 19 is encased within a box 23 (see Fig. 2) having an upper end plate 24 and a lower end plate 25, such end plates being secured to the box 23 by any suitable means, for instance, by clamping elements 26, 26. To the upper plate 24, on the inner face thereof, is attached, as by rivet 27, a spring leaf 28 bearing against the end face of the disc 29 rigidly secured to the shaft 19. Near the opposite end of the shaft 19 is rigidly secured a disc 29'. A hub 30 forms a bearing in the end plate 25 for the shaft 19, the end of the shaft 19 passing through, and projecting beyond said bearing for positioning the box 23 in the slot 18 of the frame 10.

The side of the box 23 facing the center of the frame 11 when the box has been inserted into its position within the frame, is provided with a longitudinal slit 31 running the length thereof, such slit being of sufficient width to permit the passage therethrough of the strip of paper wound upon the shaft 19 and which bears the reading matter.

The strip of paper 33 having the reading matter printed upon both sides thereof, is secured at one end to the shaft 19, as by being pinched in a recess 32 in the surface thereof, and is wound upon such shaft, the loose end thereof passing through the slit 31 and converging, as shown in the enlarged detail in Fig. 7, into a tab 34, such tab being attached in any suitable manner to a cylindrical anchor member 35. The diameter of such anchor member is greater than the width of the slit 31 so that the end of the strip 33 will be prevented from being drawn into the interior of the box 23 by the abutment of the cylindrical bar 35 against the edges of the slit 31.

Within the frame 10 and contiguous with its opposite side is mounted a shaft 36 passing through the panel forming the upper end of the frame, the shaft 36 being provided on its end exteriorly of the frame with a knurled knob 37 having an integral hub 38. A bearing hub 39 is provided in the panel or wall of the frame 10 against which the end of the shaft 36 bears. A disc 40 is mounted on the shaft 36 in substantial alignment with the disc 29 of the shaft 19.

The opposite end of the shaft 36 is supported within a bearing 41 in the panel or wall forming the lower end of the frame 10. A disc 42 is provided on the shaft 36 and is held in substantial alignment with the disc 29' of the shaft 19 by means of a leaf spring 43 secured to the wall of the frame by rivet 44.

The strip of reading matter is unwound from the shaft 19 a sufficient extent to bring the cylindrical bar 35 above the shaft 36 and to permit the insertion of such cylindrical bar into a recess 45 formed in the surface of the shaft 36 and of substantially such width, depth, and length as to accommodate such bar. As the shaft 36 is rotated by turning the knob 37, the strip of paper bearing the reading matter thereon will be wound upon the shaft 36 with the same speed and to the same extent as it is unwound from the shaft 19 at the opposite side of the frame.

The strip of printed matter, in its passage from the box 23 onto the shaft 36, is passed between the windows 14 and 15 which may be provided with sheets of a transparent material 45, for instance, glass, celluloid, or composition material, which may be supported within the openings 14 and 15 by any suitable means as flanges 46, 47 (see Fig. 6).

The frictional springs 28 and 43 maintain the strip carrying the reading matter in proper taut relation.

The operation of my novel reading device is as follows:

The strip 33 has printed upon one side thereof in blocks, such for instance, as the page of a book, the reading matter comprising one half of the total contained in the book or magazine. On the other side of the strip 33 is printed the remaining portion of the reading matter. For instance, if the volume the pages of which are to be reproduced upon one side of the strip forming a part of my reading device, comprises 400 pages, the first 200 of such pages are reproduced upon one side of the strip 33 in consecutive order from left to right and the remaining 200 pages are reproduced on the reverse side of the strip in consecutive order from page 201 to page 400, numbered from right to left. The strip of printed matter is wound upon the shaft 19 within the box 23 and the box is inserted into position within my reading device in the manner described. The tab 34 at the tapered end of the strip 33 is then secured by means of the cylindrical anchor member 35 within the recess 45 of shaft 36, the strip 33 being unwound from the shaft 19 a sufficient extent to permit this operation. The knob 37 at the upper end of the shaft 36 is then rotated so as to wind a portion of the strip 33 upon the shaft 36 until page 1 of the reproduced volume is positioned opposite the window or opening 14. Of course, before the appearance of page 1 of the reproduced printed matter opposite the window 14, a title page reproduced on the strip has been passed under the aperture forming the window. As each successive page of the reproduced printed matter has been read, the knob 37 is rotated so as to bring the next succeeding page within the outline of the window 14. As the reading of the book reproduced progresses in this manner and the knob is rotated, the strip 33 is being unwound from the shaft 19 and wound upon the shaft 36. My novel reading device thus provides a convenient frame for retaining the reading matter in position, the reader holding such frame just as he would be holding an ordinary book.

When one half of the reading matter has been read in this manner, the reader need only turn my reading device so that the opposite side thereof faces upwardly, when the next succeeding page will be visible through the window 15 on the opposite side of the device. The reading of the book then progresses in the same manner until all of the printed matter upon the strip 33 has been exposed to view through the window 15 and the entire strip has been again wound upon the shaft 19.

When a book or magazine has thus been read and the box 23 containing the roll of reading matter has been removed therefrom by opening the cover 11 and lifting the box 23 from its position within the frame, the device is ready for the insertion of another and different box containing a reproduction upon a strip of paper of the reading matter of another novel or magazine. Any such box may be re-inserted into the refillable reading frame for repeated readings.

The novel reading device hereinabove described makes possible the manufacture and sale of a book of average novel length in the form of a strip of paper wound into a scroll upon a shaft mounted within a box about six inches in length and one square inch in cross-sectional area, taking up an extremely small amount of space, a whole library being capable of inclusion in the amount of space formerly required by a few volumes of books of standard size. With such a library, a reader needs only a single frame of the type described which is easily handled and takes up less space than would ordinarily be occupied by a single volume of a novel of standard length. The ease of manipulation of my novel reading device in the insertion into the frame of the desired reading matter and the manner of its progression when in the frame, is a feature of my invention which will appeal particularly to the modern reading public.

The frame itself provides a visual margin for each portion of reading matter visible through the windows, thereby eliminating the need for the wide paper margins surrounding the type matter on each page of an ordinary book; thus effecting a great economy in paper and consequent compactness.

While I have described a particular embodiment of my invention, it is obvious that various modifications therein, particularly in the arrangement of the several parts, may be made therein without departing from my invention.

I claim:

1. A reading device comprising a frame, having a window opening and slits adjacent said window opening, said frame having disposed at parallel sides thereof compartments, a container having a shaft and removably mounted within one of said compartments, a strip of paper having reading matter printed thereon secured at one end to, and wound upon, said shaft, a second shaft permanently secured within the other of said compartments and adapted to have secured thereto the free end of said strip, and means external to the frame for effecting the unwinding of said strip from said first mentioned shaft, passing said strip from one compartment to the other through the slits and over the window opening and simultaneously winding the same upon said second shaft.

2. A reading device as claimed in claim 1, in which the shaft removably mounted in the frame and the portion of the strip wound thereon are encased in a box removable from the frame.

3. A reading device as claimed in claim 1, in which the means for unwinding the strip from the first shaft and simultaneously winding the same upon the second shaft comprises a knurled knob at the end of said second shaft extending outside of said frame.

4. A reading device as claimed in claim 1, including means for rewinding said strip upon said first mentioned shaft and simultaneously unwinding the same from said second shaft.

5. A reading device as claimed in claim 1, including means for rewinding said strip upon said first mentioned shaft and simultaneously unwinding the same from said second shaft, said means comprising a knurled knob at the end of said first mentioned shaft extending outside of said frame.

6. A reading device as claimed in claim 1, in which the peripheral edges of the window define an area within which the strip bearing the printed matter and extending from one shaft to the other, may be viewed through said window.

7. A reading device as claimed in claim 1, in which the peripheral edges of said window are depressed below the planes of the frame to an extent to bring said peripheral edges of said windows in proximate contact with the strip of printed matter passed beneath the same.

8. A reading device comprising a frame, having a window opening and slits adjacent said window opening, said frame having disposed at parallel sides thereof compartments, each adapted to receive a roll of films, a shaft in each compartment, a film supply container in one compartment of the frame, adapted to enclose a film roll, and having an external contour substantially the same as the internal contour of the compartment, and means external to the frame to rotate the shafts, whereby upon the unwinding of the film from one shaft it is wound on the other shaft in passing from one compartment to the other through the slits and over the window openings.

9. A reading device comprising a frame, having a window opening and slits adjacent said window opening, said frame having disposed at parallel sides thereof compartments, each adapted to receive a roll of films, a shaft in each compartment, a film supply container in one compartment of the frame, adapted to enclose a film roll, and having an external contour substantially the same as the internal contour of the compartment and having a slit in one of its sides in registration with one of the slits of the window opening, and means external to the frame to rotate the shafts, whereby upon the unwinding of the film from one shaft it is wound on the other shaft in passing from one compartment to the other through the slits and over the window openings.

LOUIS GRUDIN.